United States Patent
Seigo

(10) Patent No.: US 8,974,086 B2
(45) Date of Patent: Mar. 10, 2015

(54) LENS, MOLD FOR LENS AND METHOD FOR MACHINING MOLD

(75) Inventor: Masafumi Seigo, Osaka (JP)

(73) Assignee: Nalux Co., Ltd., Osaka (JP)

( * ) Notice: Subject to any disclaimer, the term of this patent is extended or adjusted under 35 U.S.C. 154(b) by 491 days.

(21) Appl. No.: 13/339,556

(22) Filed: Dec. 29, 2011

(65) Prior Publication Data

US 2012/0230038 A1    Sep. 13, 2012

Related U.S. Application Data

(63) Continuation of application No. PCT/JP2011/001389, filed on Mar. 9, 2011.

(51) Int. Cl.
| | |
|---|---|
| *F21V 5/04* | (2006.01) |
| *B29D 11/00* | (2006.01) |
| *G02B 9/04* | (2006.01) |
| *G02B 27/30* | (2006.01) |
| *G02B 3/06* | (2006.01) |

(52) U.S. Cl.
CPC .............. *B29D 11/0048* (2013.01); *G02B 9/04* (2013.01); *G02B 27/30* (2013.01); *C03B 2215/03* (2013.01); *G02B 3/06* (2013.01)
USPC .......................................... 362/268; 362/259

(58) Field of Classification Search
CPC ........ G02B 27/34; G02B 27/09; G02B 27/30; G02B 27/0966; G02B 3/00; G02B 3/0025; G02B 3/06; G02B 13/003; G02B 9/04; G02B 9/10; F21V 5/04; F21Y 2101/025

USPC .......... 362/259, 268, 335, 641, 710; 359/618, 359/641, 710

See application file for complete search history.

(56) References Cited

U.S. PATENT DOCUMENTS

| | | | |
|---|---|---|---|
| 6,069,748 A * | 5/2000 | Bietry | ........................... 359/719 |
| 2011/0002042 A1 | 1/2011 | Kuroda et al. | |

FOREIGN PATENT DOCUMENTS

| | | |
|---|---|---|
| EP | 2256458 A1 | 12/2010 |
| JP | 2002-178254 | 6/2002 |
| JP | 2006-007551 | 1/2006 |
| JP | 2006-297562 | 11/2006 |
| JP | 4599514 | 10/2010 |

OTHER PUBLICATIONS

International Search Report and Written Opinion corresponding to International Application No. PCT/JP2011/001389 dated Apr. 12, 2011.

* cited by examiner

*Primary Examiner* — Y M Lee
(74) *Attorney, Agent, or Firm* — Squire Patton Boggs (US) LLP

(57) ABSTRACT

A lens used for a line generating optical system is provided, wherein X-axis is defined in longitudinal direction of the generated line, Y-axis is defined in width direction and Z-axis is defined in direction of the optical axis and wherein the lens has an optical surface which does not collimate the light in X-axis direction and which collimates or collects the light in Y-axis direction alone, inclination of direction of transferred tool mark with respect to X-axis being from 40 to 50 degrees in an area of 80% or more of the optical surface.

3 Claims, 7 Drawing Sheets

MACHINING PATH ANGLE (deg)

MACHINING PATH ANGLE (deg)

LENS, MOLD FOR LENS AND METHOD FOR MACHINING MOLD

FIELD OF THE INVENTION

The present invention relates to a lens used for a line generator using a laser diode light source or the like, a mold for the lens and a method for machining the mold.

BACKGROUND ART

On building and construction sites and in factories, line generators using light sources such as laser diodes, light emitting diodes, and optical fibers are used for setting fiducial lines for positioning, step height measurement and detection of defects (Patent document 1).

To generate a line, the optical system of a line generator collimates diffused light from the light source such as a laser diode in width direction of the line to be generated and uniformly distributes the light in longitudinal direction of the line to be generated. A distribution pattern of the light in the line width direction should preferably be rectangular with sharp boundaries. However, even in an optical system using lenses provided with optical surfaces which satisfy specifications, boundaries in the line width direction are not sharp sometimes and ghosts (stray lights) sometimes appear on the outside in the line width direction.

In short, a lens used for a line generator, which generates a line in such a way that a distribution pattern of light in the line width direction is rectangular with sharp boundaries, a mold for the lens and a method for machining the mold have not been developed.

Patent document 1: JP4599514B

Accordingly, there is a need for a lens used for a line generator, which generates a line in such a way that a distribution pattern of light in the line width direction is rectangular with sharp boundaries, a mold for the lens and a method for machining the mold.

SUMMARY OF THE INVENTION

A lens according to a first aspect of the present invention is a lens used for a line generating optical system which generates a line using light from a light source, wherein X-axis is defined in longitudinal direction of the generated line, Y-axis is defined in width direction of the generated line and Z-axis is defined in direction of the optical axis and wherein the lens has an optical surface which does not collimate the light in X-axis direction and which collimates or collects the light in Y-axis direction alone, inclination of direction of transferred tool mark with respect to X-axis being from 40 degrees to 50 degrees in an area of 80% or more of the optical surface.

In the lens according to the present embodiment, inclination of direction of transferred tool mark with respect to X-axis is from 40 degrees to 50 degrees in an area of 80% or more of the optical surface. Accordingly, ghosts due to diffraction caused by the transferred tool mark will not appear in width direction of the line and roughness of the optical surface is within acceptable limits.

A mold for a lens according to a second aspect of the present invention is a mold for a lens used for a line generating optical system which generates a line using light from a light source, wherein X-axis is defined in longitudinal direction of the generated line, Y-axis is defined in width direction of the generated line and Z-axis is defined in direction of the optical axis and wherein the lens has an optical surface which does not collimate the light in X-axis direction and which collimates or collects the light in Y-axis direction alone, inclination of direction of tool mark with respect to X-axis being from 40 degrees to 50 degrees in an area of the mold surface corresponding to an area of 80% or more of the optical surface.

In the mold for a lens according to the present embodiment, inclination of direction of tool mark with respect to X-axis being from 40 degrees to 50 degrees in an area of the mold surface corresponding to an area of 80% or more of the optical surface. Accordingly, a lens in which ghosts due to diffraction caused by the transferred tool mark will not appear in width direction of the line and roughness of the optical surface is within acceptable limits can be molded with the mold.

A method for machining a mold according to a third aspect of the present invention is a method for machining a mold for a lens used for a line generating optical system which generates a line using light from a light source, wherein X-axis is defined in longitudinal direction of the generated line, Y-axis is defined in width direction of the generated line and Z-axis is defined in direction of the optical axis and wherein the lens has an optical surface which does not collimate the light in X-axis direction and which collimates or collects the light in Y-axis direction alone and wherein the mold is machined in such a way that inclination of direction of tool mark with respect to X-axis is from 40 degrees to 50 degrees in an area of the mold surface corresponding to an area of 80% or more of the optical surface.

In the method for machining a mold according the present aspect, the mold is machined in such a way that inclination of direction of tool mark with respect to X-axis is from 40 degrees to 50 degrees in an area of the mold surface corresponding to an area of 80% or more of the optical surface. Accordingly, a mold for a lens in which ghosts due to diffraction caused by the transferred tool mark will not appear in width direction of the line and roughness of the optical surface is within acceptable limits can be obtained by the method according the present aspect.

MODE FOR CARRYING OUT THE INVENTION

Since molds for glass are hard, grinding stones are used to machine the molds. In machining with a grinding stone, the grinding stone being rotated at a high speed is moved along a machining path to machine the mold.

Figure 1:
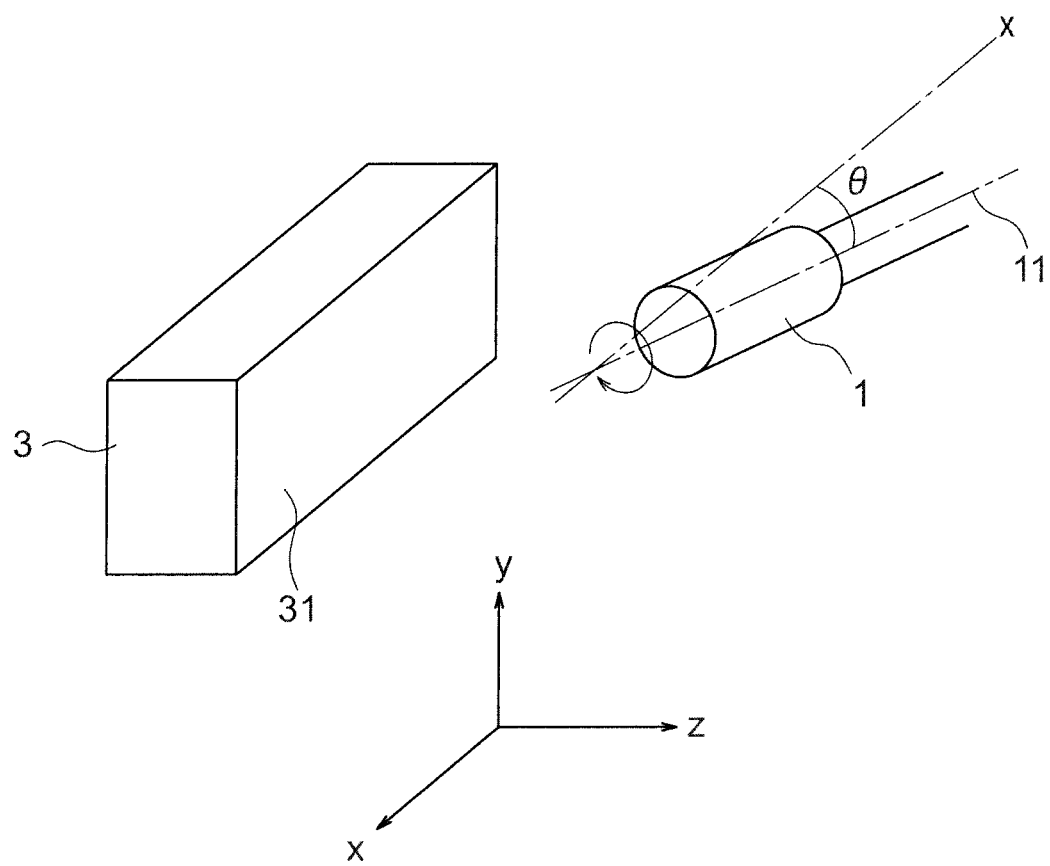
FIG. 1 illustrates machining with a grinding stone.

FIG. 1 illustrates machining with a grinding stone. In FIG. 1, a grinding stone 1 is assumed to move in X-axis direction. That is, the direction of the machining path is X-axis direction. Y-axis is set in such a way that a plane formed by X-axis and Y-axis is parallel to a surface 31 to be machined of a work piece 3. A rotating axis 11 of the grinding stone 1 is in a direction forming an angle of θ from X-axis direction in a plane parallel to the plane formed by X-axis and Z-axis. θ ranges from 0 to 90 degrees.

In FIG. 1, the direction of rotation of the grinding stone 1 at a machining point is Y-axis direction which is perpendicular to the direction of the machining path, that is, X-axis direction. In machining with a grinding stone, the direction of rotation of the grinding stone (Y-axis direction in FIG. 1) and the direction of the machining path (X-axis direction in FIG. 1) should most preferably be set orthogonal to each other from the standpoint of roughness of the machined surface as described later.

Figure 2:
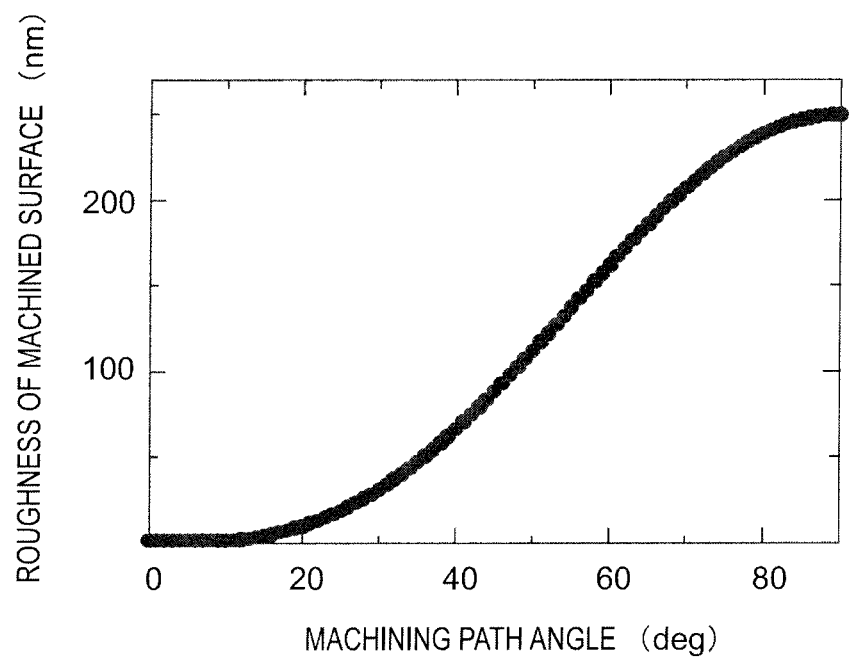
FIG. 2 shows a relationship between machining path angle and roughness of the machined surface in machining with a grinding stone.

FIG. 2 shows a relationship between machining path angle and roughness of the machined surface in machining with a grinding stone. The horizontal axis of FIG. 2 indicates machining path angle. The vertical axis of FIG. 2 indicates roughness of the machined surface. Machining path angle is the angle which the direction of the machining path forms with the direction of reference path. The direction of reference path is the direction perpendicular to the direction of rotation of the grinding stone. In FIG. 1, the direction of reference path is X-axis direction. Accordingly, in FIG. 1, since the direction of the machining path agrees with X-axis direction, the machining path angle is zero degree. According to FIG. 2, roughness of the machined surface is substantially zero when the machining path angle is zero degree while roughness of the machined surface reaches 250 nanometers when the machining path angle is 90 degrees, that is, when the direction of the machining path is set to the direction of Y-axis direction in FIG. 1. Accordingly, in machining with a grinding stone, the direction of the machining path has conventionally been set to the direction of reference path in order to minimize roughness of the machined surface.

Machining of a mold for a lens will be described below. In order to produce a lens, first a mold for a lens is produced by machining and then using the mold, glass or the like is molded into the lens. When curvatures of the lens in two directions which are orthogonal to each other in the plane perpendicular to the optical axis of the lens are different, the direction of rotation of the grinding stone should preferably be set to the direction in which curvature is greater for a higher accuracy of the mold for the lens. The reason is that machining accuracy in the direction of rotation of the grinding stone (Y-axis direction in FIG. 1) depends on an amount of runout of rotation, and the amount can be reduced to 10 nanometers or less, which is smaller than accuracy in the direction of the machining path (for example, X direction in FIG. 1), which depends on a shape of the tool.

As examples of lenses according to the present invention, lenses used for a line generator will be described. The lenses of the examples described below are made of glass and their molds are produced by machining. In the text of specification, the phrase "to be collimated (to collimate)" also refers to "to be collected (to collect) at a distant point".

EXAMPLE 1

Figure 3:
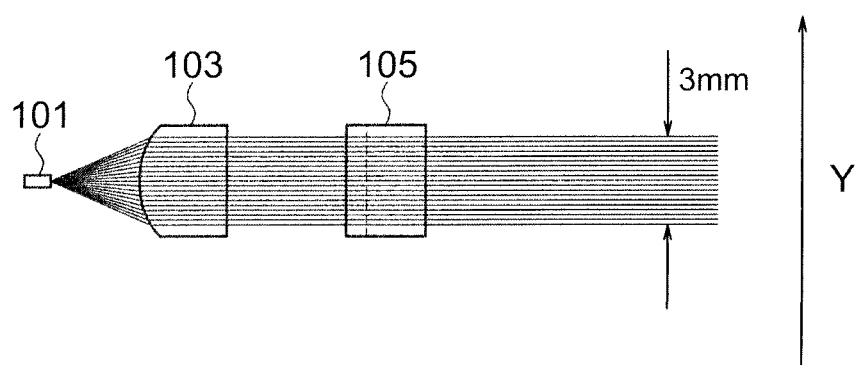
FIG. 3 illustrates a configuration of a line generator according to Example 1 of the present invention.
Figure 4:
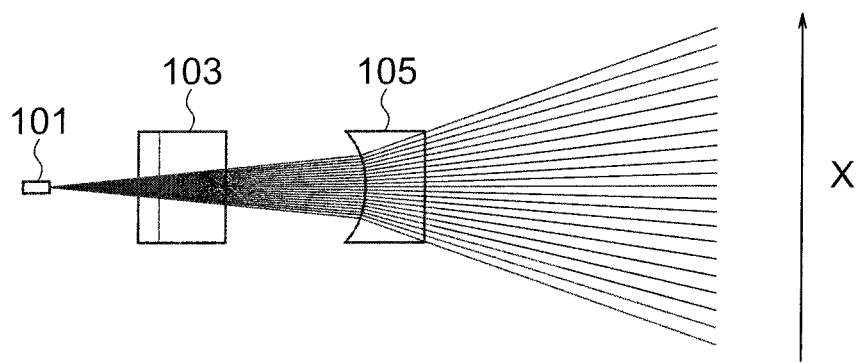
FIG. 4 illustrates a configuration of the line generator according to Example 1 of the present invention.

FIGS. 3 and 4 illustrate the configuration of a line generator according to Example 1 of the present invention. The line generator includes a laser diode light source 101, a first lens 103 which is a cylindrical lens and a second lens 105 which is a cylindrical lens. FIG. 3 shows a cross sectional view in the vertical direction (fast-axis (FA) direction) of the laser diode light source 101 while FIG. 4 shows a cross sectional view in the horizontal direction (slow-axis (SA) direction) of the laser diode light source 101. In FIG. 3, light emitted by the laser diode light source 101 is collimated by the first lens 103 in the FA direction to generate a light beam having a width of 3 millimeters. The width of the light beam after the collimation is that of the line generated by the line generator. Since the first lens 103 is a cylindrical one, the light is not collimated in the SA direction by the first lens 103. The light collimated in the FA direction by the first lens 103 is diverged in the SA direction by the second lens 105 to generate the line.

In the present example, the first lens 103 is used to determine a width of the line while the second lens 105 is used to generate the line which has a desired brightness distribution along it. Thus, function of the first lens 103 and that of the second lens 105 are clearly separated from each other.

Table 1 shows data of the optical system of the line generator according to Example 1. The value entered at the cross point of the row labeled "light source" and the column labeled "surface interval" indicates an interval between the light source and the first lens. The value entered at the cross point of the row labeled "2" and the column labeled "surface interval" indicates a thickness of the first lens. The value entered at the cross point of the row labeled "3" and the column labeled "surface interval" indicates an interval between the first lens and the second lens. The value entered at the cross point of the row labeled "4" and the column labeled "surface interval" indicates a thickness of the second lens. Unit of length in Table 1 and the tables described below is millimeter.

TABLE 1

| Surface No. | | Surface interval | Refractive index | Abbe constant |
|---|---|---|---|---|
| | Light source | 3.0 | | |
| 2 | First lens (Cylindrical surface) | 3.0 | 1.60606 | 54.88 |
| 3 | First lens (Plane) | 3.8 | | |
| 4 | Second lens (Cylindrical surface) | 2.0 | 1.60606 | 54.88 |
| 5 | Second lens (Plane) | | | |

Assuming that the FA direction is the direction of x-axis and the SA direction is the direction of y-axis, the optical surfaces of the first lens (the second surface on the object side and the third surface on the image side) are represented by the following expressions.

$$z = \frac{cx^2}{1 + \sqrt{1 - (1+k)c^2 x^2}} + \sum_{i=2}^{n} \alpha_{2i} x^{2i} \quad (1)$$

$$c = 1/R \quad (2)$$

k represents a constant for determining a shape of the quadratic curve, c represents a curvature at the center, and R represents a radius of curvature at the center. $\alpha_{2i}$ represents correcting coefficients.

Table 2 shows coefficients or constants in the expressions representing the second and third surfaces.

TABLE 2

|  | Second surface | Third surface |
|---|---|---|
| R | 1.820144 | infinity |
| k | −2.571631 | 0 |
| $\alpha_4$ | $5.85685 \times 10^{-6}$ | 0 |
| $\alpha_6$ | $2.113507 \times 10^{-7}$ | 0 |

Assuming that the FA direction is the direction of x-axis and the SA direction is the direction of y-axis, the optical surfaces of the second lens (the fourth surface on the object side and the fifth surface on the image side) are represented by the following expression.

$$z = \sum_{i=1}^{n} \alpha_{2i} y^{2i} \quad (3)$$

$\alpha_{2i}$ represents correcting coefficients.

Table 3 shows coefficients or constants in the expressions representing the fourth and fifth surfaces.

TABLE 3

|  | Fourth surface | Fifth surface |
|---|---|---|
| $\alpha_2$ | −0.844902 | 0 |
| $\alpha_4$ | 0.359297 | 0 |
| $\alpha_6$ | −0.099127 | 0 |
| $\alpha_8$ | −0.012041 | 0 |
| $\alpha_{10}$ | 0.021224 | 0 |
| $\alpha_{12}$ | $-5.281427 \times 10^{-3}$ | 0 |

How to produce the first lens of Example 1 using a mold will be described.

Curvature of the surface on the object side of the first lens 103 of Example 1 in the cross section of the first lens in the fast-axis direction of the laser diode light source 101 is greater than that in the slow-axis direction. Accordingly, Y-axis direction which is the direction of rotation of the grinding stone was set to the fast-axis direction in the first lens 103 while X-axis direction which is the direction of the machining path was set to the slow-axis direction in the first lens 103. Then a mold of the first lens 103 was machined and the first lens 103 was produced by molding. The x-axis and y-axis used to represent coordinates of the optical surfaces described above correspond to Y-axis and X-axis for machining, respectively. As a result, tool mark in X-axis direction appears on the surface of the mold, which corresponds to the surface on the object side of the first lens 103, and the tool mark is transferred to the surface on the object side of the first lens 103. Accordingly, the surface on the object side of the first lens 103 has transferred tool mark in X-axis direction. Since the pitch of the machining path is from 2 to 10 micrometers, the pitch of the transferred tool mark is also from 2 to 10 micrometers.

EXAMPLE 2

Figure 5:
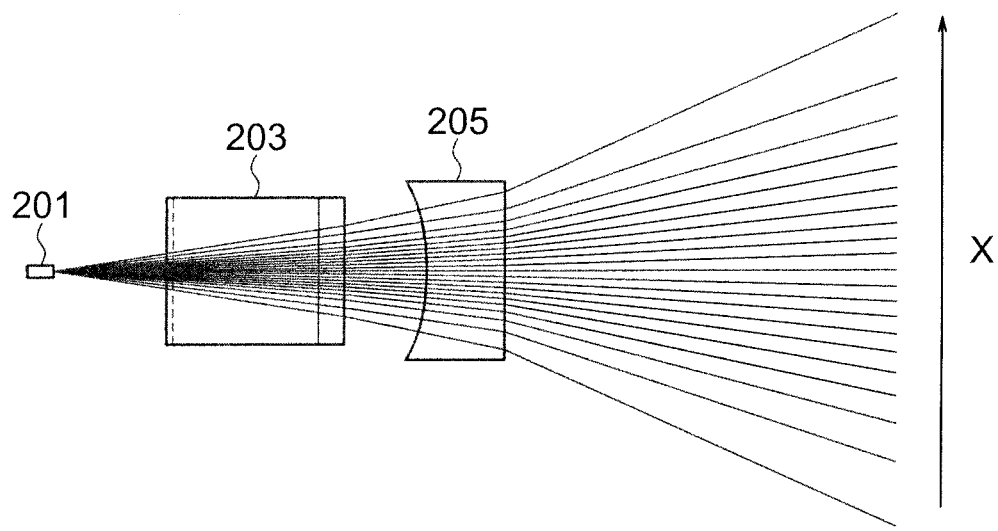
FIG. 5 illustrates a configuration of a line generator according to Example 2 of the present invention.
Figure 6:
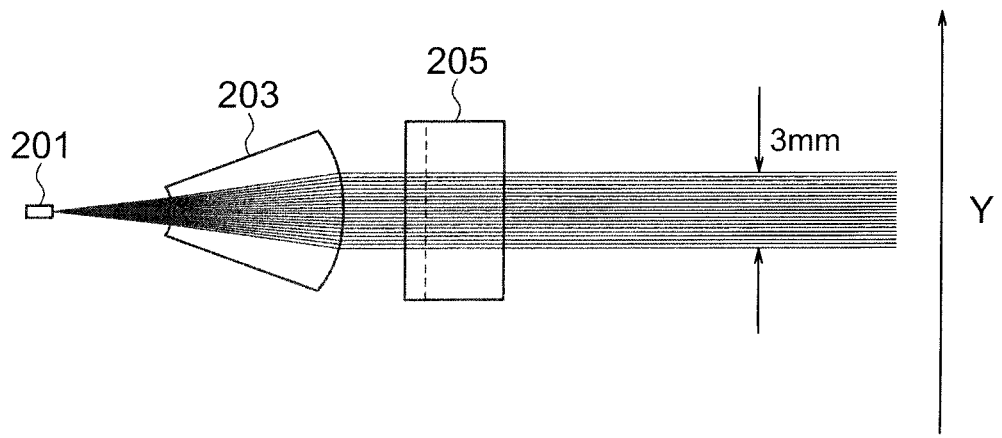
FIG. 6 illustrates a configuration of the line generator according to Example 2 of the present invention.

FIGS. 5 and 6 illustrate the configuration of a line generator according to Example 2 of the present invention. The line generator includes a laser diode light source 201, a first lens 203 which is a cylindrical lens and a second lens 205 which is a cylindrical lens. FIG. 5 shows a cross sectional view in the vertical direction (fast-axis (FA) direction) of the laser diode light source 201 while FIG. 6 shows a cross sectional view in the horizontal direction (slow-axis (SA) direction) of the laser diode light source 201. In FIG. 6, light emitted by the laser diode light source 201 is collimated by the first lens 203 in the SA direction to generate a light beam having a width of 3 millimeters. The width of the light beam after the collimation is that of the line generated by the line generator. Since the first lens 203 is a cylindrical one, the light is not collimated in the FA direction by the first lens 203. The light collimated in the SA direction by the first lens 203 is diverged in the FA direction by the second lens 205 to generate the line.

In the present example, the first lens 203 is used to determine a width of the line while the second lens 205 is used to generate the line which has a desired brightness distribution along it. Thus, function of the first lens 203 and that of the second lens 205 are clearly separated from each other.

Table 4 shows data of the optical system of the line generator according to Example 2.

TABLE 4

| Surface No. |  | Surface interval | Refractive index | Abbe constant |
|---|---|---|---|---|
|  | Light source | 3.0 |  |  |
| 2 | First lens (Cylindrical surface) | 4.3 | 2.09822 | 16.81 |
| 3 | First lens (Cylindrical surface) | 2.0 |  |  |
| 4 | Second lens (Cylindrical surface) | 1.5 | 2.09822 | 16.81 |
| 5 | Second lens (Plane) |  |  |  |

Assuming that the FA direction is the direction of x-axis and the SA direction is the direction of y-axis, the optical surfaces of the first lens (the second surface on the object side and the third surface on the image side) are represented by the following expressions.

$$z = \frac{cy^2}{1 + \sqrt{1 - (1+k)c^2 y^2}} + \sum_{i=2}^{n} \alpha_{2i} y^{2i} \quad (4)$$

$$c = 1/R \quad (2)$$

Table 5 shows coefficients or constants in the expressions representing the second and third surfaces.

TABLE 5

|  | Second surface | Third surface |
|---|---|---|
| R | −1.15912 | −3.076346 |
| k | 0 | −2.169073 |
| $\alpha_4$ | 0 | −0.0074658746 |
| $\alpha_6$ | 0 | $-9.2201849 \times 10^{-5}$ |
| $\alpha_8$ | 0 | $-3.5989053 \times 10^{-5}$ |
| $\alpha_{10}$ | 0 | $1.3851247 \times 10^{-5}$ |
| $\alpha_{12}$ | 0 | $-1.1845873 \times 10^{-6}$ |

Assuming that the FA direction is the direction of x-axis and the SA direction is the direction of y-axis, the optical surfaces of the second lens (the fourth surface on the object side and the fifth surface on the image side) are represented by the following expressions.

$$z = \frac{cx^2}{1 + \sqrt{1-(1+k)c^2x^2}} + \sum_{i=2}^{n} \alpha_{2i}x^{2i} \quad (1)$$

$$c = 1/R \quad (2)$$

k represents a constant for determining a shape of the quadratic curve, c represents a curvature at the center, and R represents a radius of curvature at the center. $\alpha_{2i}$ represents correcting coefficients.

Table 6 shows coefficients or constants in the expressions representing the fourth and fifth surfaces.

TABLE 6

|  | Fourth surface | Fifth surface |
|---|---|---|
| R | −3.47249 | infinity |
| k | −14.57677 | 0 |
| $\alpha_4$ | −0.029509 | 0 |
| $\alpha_6$ | 0.012712 | 0 |
| $\alpha_8$ | −3.192851 × 10⁻³ | 0 |
| $\alpha_{10}$ | 4.305014 × 10⁻⁴ | 0 |
| $\alpha_{12}$ | −2.556248 × 10⁻⁵ | 0 |

How to produce the first lens of Example 2 using a mold will be described.

Curvatures of the surfaces on the object side and the image side of the first lens 203 of Example 2 in the cross section of the first lens in the slow-axis direction of the laser diode light source 201 are greater than those in the fast-axis direction. Accordingly, Y-axis direction which is the direction of rotation of the grinding stone was set to the slow-axis direction in the first lens 203 while X-axis direction which was the direction of the machining path was set to the fast-axis direction in the first lens 203. Then a mold of the first lens 203 was machined and the first lens 203 was produced by molding. The x-axis and y-axis used to represent coordinates of the optical surfaces described above correspond X-axis and Y-axis for machining, respectively. As a result, tool mark in X-axis direction appears on the surfaces of the mold, which correspond to the surfaces on the object side and the image side of the first lens 203, and the tool mark is transferred to the surfaces on the object side and the image side of the first lens 203. Accordingly, the surfaces on the object side and the image side of the first lens 203 have transferred tool mark in X-axis direction. Since the pitch of the machining path is from 2 to 10 micrometers, the pitch of the transferred tool mark is also from 2 to 10 micrometers.

EXAMPLE 3

Figure 7:
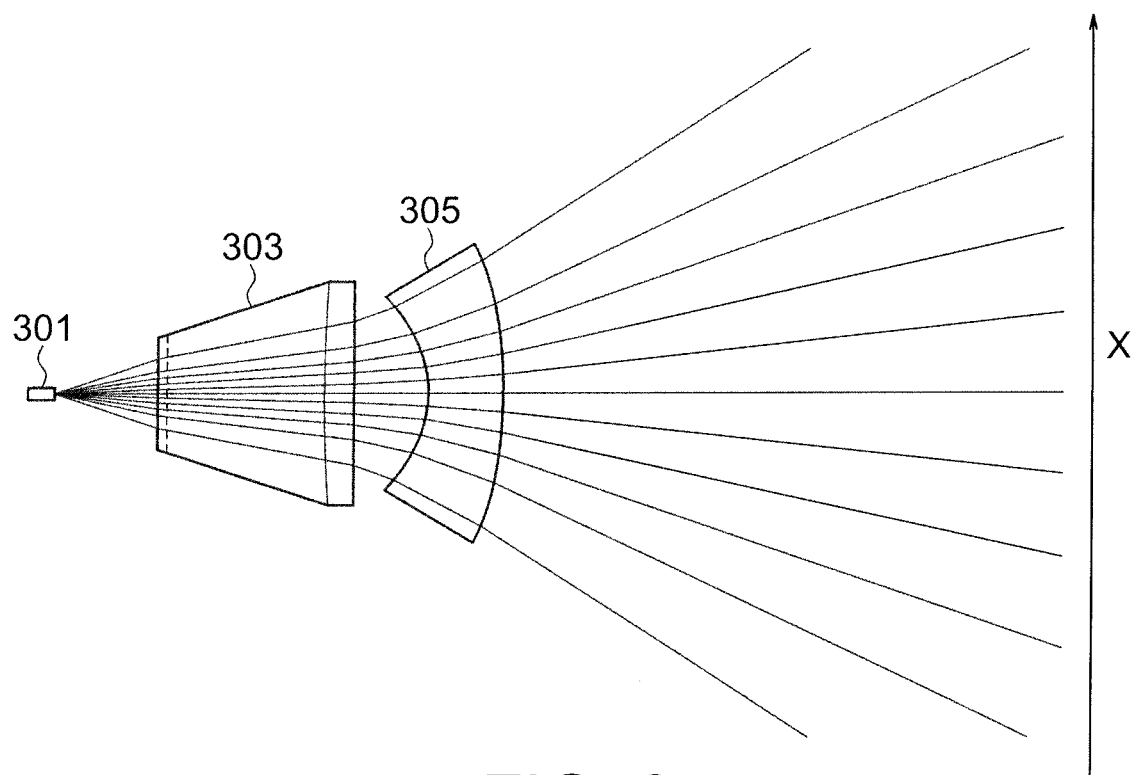
FIG. 7 illustrates a configuration of a line generator according to Example 3 of the present invention.
Figure 8:
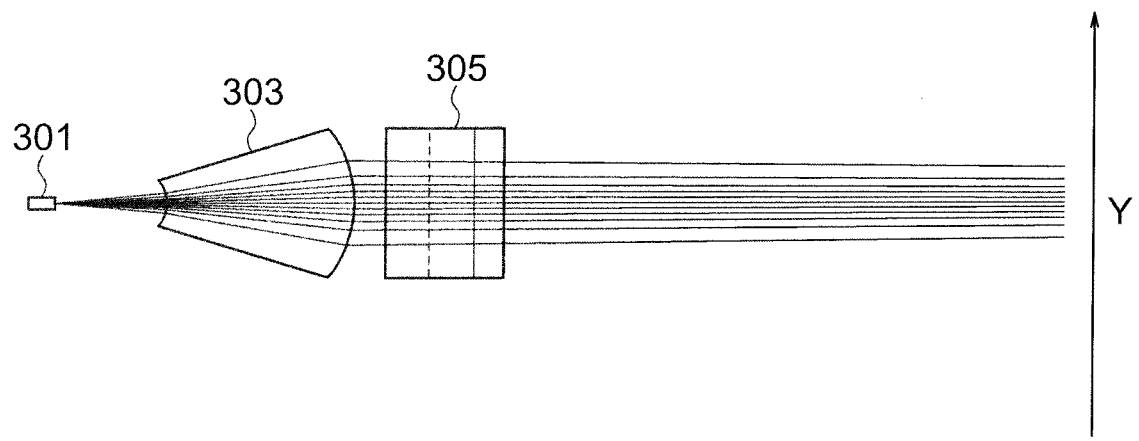
FIG. 8 illustrates a configuration of the line generator according to Example 3 of the present invention.

FIGS. 7 and 8 illustrate the configuration of a line generator according to Example 3 of the present invention. The line generator includes a laser diode light source 301, a first lens 303 which is a cylindrical lens and a second lens 305 which is a cylindrical lens. FIG. 7 shows a cross sectional view in the vertical direction (fast-axis (FA) direction) of the laser diode light source 301 while FIG. 8 shows a cross sectional view in the horizontal direction (slow-axis (SA) direction) of the laser diode light source 301. In FIG. 8, light emitted by the laser diode light source 301 is collimated by the first lens 303 in the SA direction to generate a light beam having a width of 3 millimeters. The width of the light beam after the collimation is that of the line generated by the line generator. Since the first lens 303 is a cylindrical one, the light is not collimated in the FA direction by the first lens 303. The light collimated in the SA direction by the first lens 303 is diverged in the FA direction by the second lens 305 to generate the line.

Table 7 shows data of the optical system of the line generator according to Example 3.

TABLE 7

| Surface No. |  | Refractive index | Abbe constant | Surface interval |
|---|---|---|---|---|
|  | Light source |  |  | 3.0 |
| 2 | First lens (Cylindrical surface) | 1.80086 | 40.80 | 5.0 |
| 3 | First lens (Free form surface) |  |  | 3.0 |
| 4 | Second lens (Cylindrical surface) | 1.80086 | 40.80 | 2.0 |
| 5 | Second lens (Cylindrical surface) |  |  | 100 |

Assuming that the FA direction is the direction of x-axis and the SA direction is the direction of y-axis, the second surface (the surface on the object side of the first lens) is represented by the following expressions.

$$z = \frac{cy^2}{1+\sqrt{1-(1+k)c^2y^2}} \quad (5)$$

$$c = 1/R \quad (2)$$

Table 8 shows coefficients or constants in the expressions representing the second surface.

TABLE 8

|  | Second surface |
|---|---|
| R | −0.957 |
| k | 0 |

Assuming that the FA direction is the direction of x-axis and the SA direction is the direction of y-axis, the third surface (the surface on the image side of the first lens) is represented by the following expression. The third surface is a so-called free form surface. In the present example, the free form surface is determined such that it is axisymmetric with respect to x-axis and y-axis, the lens power in the direction along y-axis is larger than that in the direction along x-axis and lens power in the direction along y-axis around the center differs from that at the periphery.

$$z = \sum_{i,j=0}^{6} A_{ij} x^j y^i \quad (6)$$

Table 9 shows coefficients or constants in the expressions representing the third surface.

TABLE 9

| A02 | −0.17820329 |
|---|---|
| A22 | 0.0021122761 |
| A04 | −0.003687576 |
| A42 | −3.7905744 × 10⁻⁵ |
| A24 | 0.00018778603 |
| A06 | −0.0001530113 |
| A62 | 9.073778 × 10⁻⁷ |

TABLE 9-continued

| | |
|---|---|
| A44 | $-1.2914223 \times 10^{-5}$ |
| A26 | $2.627976 \times 10^{-5}$ |
| A08 | $-1.1001855 \times 10^{-5}$ |

Assuming that the FA direction is the direction of x-axis and the SA direction is the direction of y-axis, the optical surfaces of the second lens (the fourth surface on the object side and the fifth surface on the image side) are represented by the following expressions.

$$z = \sum_{i=2}^{n} \alpha_{2i} x^{2i} \quad (7)$$

$\alpha_{2i}$ represents correcting coefficients.

Table 10 shows coefficients or constants in the expressions representing the fourth and fifth surfaces.

TABLE 10

| | Fourth surface | Fifth surface |
|---|---|---|
| $\alpha_2$ | $-0.17099751$ | $-0.038119791$ |
| $\alpha_4$ | $0.0$ | $-0.00068518782$ |

How to produce the first lens of Example 3 using a mold will be described.

Curvatures of the surfaces on the object side and the image side of the first lens 303 of Example 3 in the cross section of the first lens in the slow-axis direction of the laser diode light source 301 are greater than those in the fast-axis direction. Accordingly, Y-axis direction which is the direction of rotation of the grinding stone was set to the slow-axis direction in the first lens 303 while X-axis direction which was the direction of the machining path was set to the fast-axis direction in the first lens 303. Then a mold of the first lens 303 was machined and the first lens 303 was produced by molding. The x-axis and y-axis used to represent coordinates of the optical surfaces described above correspond to X-axis and Y-axis for machining, respectively. As a result, tool mark in X-axis direction appears on the surfaces of the mold, which correspond to the surfaces on the object side and the image side of the first lens 303, and the tool mark is transferred to the surfaces on the object side and the image side of the first lens 303. Accordingly, the surfaces on the object side and the image side of the first lens 303 have transferred tool mark in X-axis direction. Since the pitch of the machining path is from 2 to 10 micrometers, the pitch of the transferred tool mark is also from 2 to 10 micrometers.

As apparently shown in FIGS. 3, 6 and 8, Y-axis direction is the width direction of the line generated by the optical system. Diffused light from the light source is substantially collimated in Y-axis direction by the first lens so that the line has a certain value of width in Y-axis direction. On at least one of the surfaces on the object side and the image side, the transferred tool mark is formed in X-direction, and therefore the light which has been substantially collimated in Y-axis direction is diffracted by the transferred tool mark formed in X-direction and diffused in Y-direction.

Figure 9:
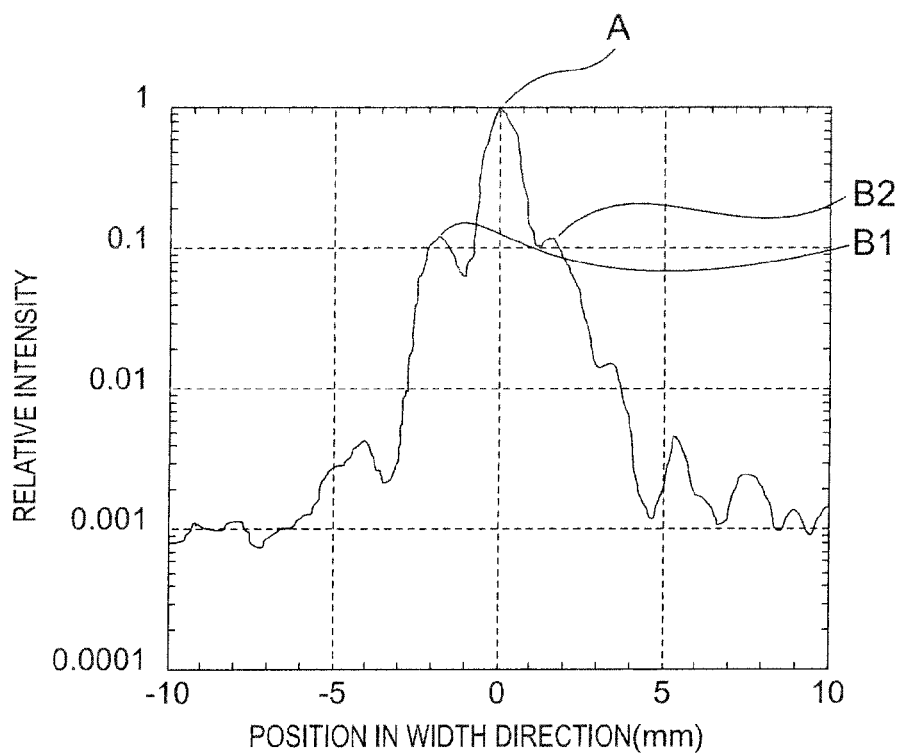
FIG. 9 shows a relationship between position in the width direction of the line generated by the optical system of Example 1 and relative intensity of light at the position.

FIG. 9 shows a relationship between position in the width direction (Y-axis direction) of the line generated by the optical system of Example 1 and relative intensity of light at the position. The horizontal axis of FIG. 9 indicates position in the width direction (Y-axis direction) of the line. "0" represents the center of the line in the width direction. The vertical axis of FIG. 9 indicates relative intensity of light. In FIG. 9, a value of intensity at the center of the line in the width direction, which is marked with A, is the largest and the value is set to 1. The horizontal axis is logarithmic. As shown in FIG. 9, the second peaks marked with B1 and B2 after the peak marked with A appear at the points approximately 1.5 millimeters away from the center in the width direction of the line. Relative intensity of the second peaks is greater than 0.1. Such a light intensity distribution in the width direction of the line seems to be attributed to diversion of light in Y-axis direction due to the transferred tool mark formed in X-axis direction.

Accordingly, it is considered effective to incline the direction of the machining path with respect to X-axis to reduce an amount of diffusion of light in the width direction of the line (Y-axis direction) due to the transferred tool mark formed in X-axis direction.

Figure 10:
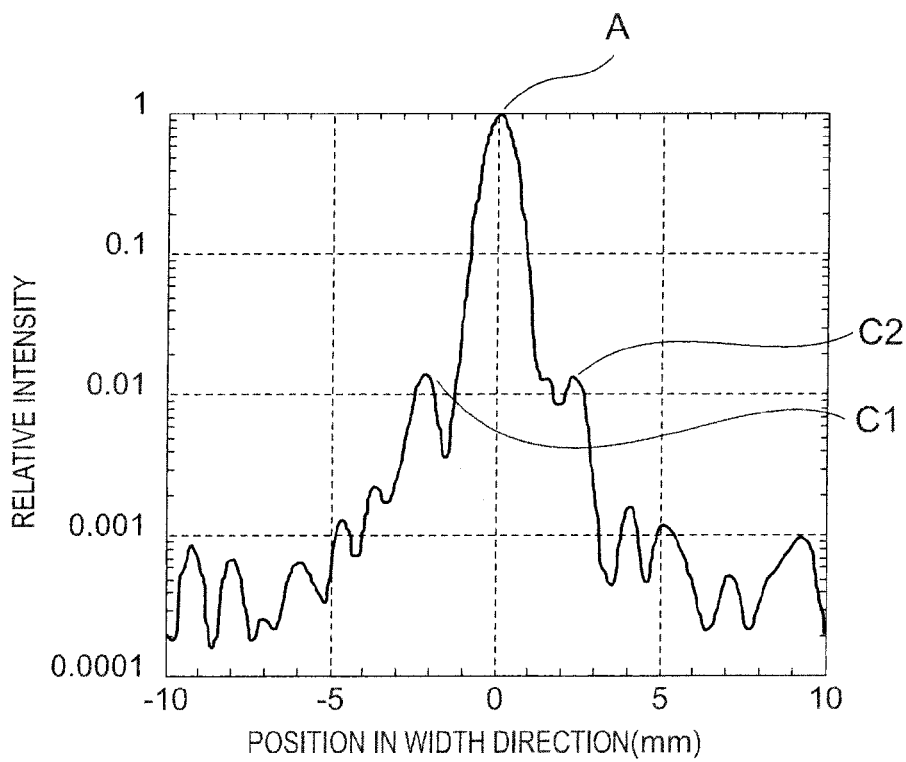
FIG. 10 shows a relationship between position in the width direction of the line generated by the optical system of Example 1 and relative intensity of light at the position when the direction of the machining path is inclined by 45 degrees with respect to X-axis.

FIG. 10 shows a relationship between position in the width direction (Y-axis direction) of the line generated by the optical system of Example 1 and relative intensity of light at the position when the direction of the machining path is inclined by 45 degrees with respect to X-axis. As shown in FIG. 10, the second peaks marked with C1 and C2 after the peak marked with A appear at the points approximately 1.5 millimeters away from the center in the width direction of the line. The relative intensity of the second peaks is approximately 0.01. Relative intensity of the second peaks marked with C1 and C2 in FIG. 10 is approximately one tenth of the relative intensity of the second peaks marked with B1 and B2 in FIG. 9. Thus, inclining the direction of the machining path by 45 degrees with respect to X-axis remarkably reduces the amount of diffusion of light in the width direction of the line (Y-axis direction) due to the transferred tool mark.

Figure 11:
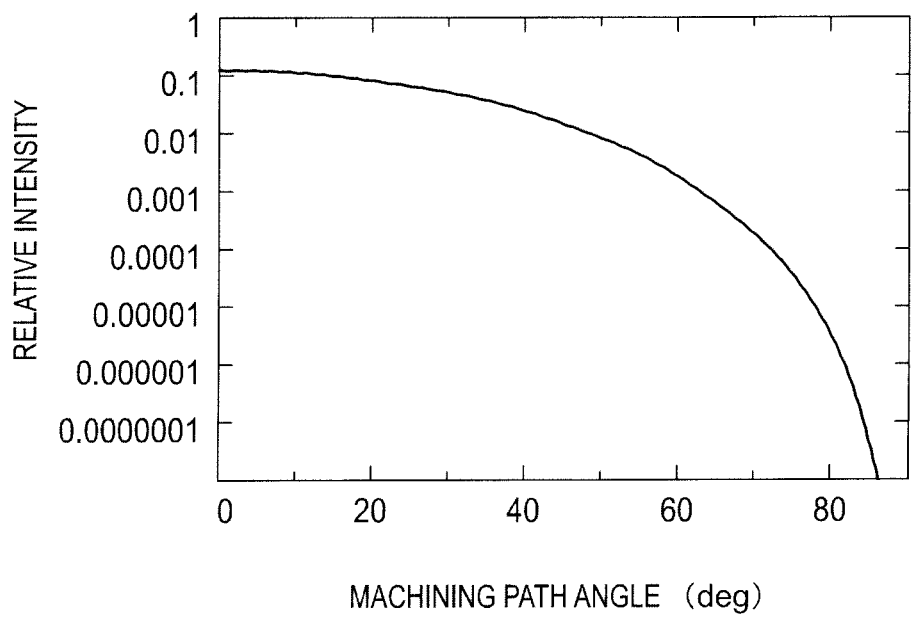
FIG. 11 shows a relationship between angle which the direction of the machining path forms with X-axis and relative intensity.

FIG. 11 shows a relationship between angle which the direction of the machining path forms with X-axis (machining path angle) and relative intensity. The horizontal axis of FIG. 11 indicates angle which the direction of the machining path forms with X-axis. The vertical axis of FIG. 11 indicates relative intensity at second peaks after the peak at the center of the line in the width direction. The relative intensity of FIG. 11 is intensity at B1 or B2 in FIG. 9 when the direction of the machining path agrees with direction of X-axis while the relative intensity of FIG. 11 is intensity at C1 or C2 in FIG. 11 when the direction of the machining path is inclined by 45 degrees with respect to X-axis. When the relative intensity of FIG. 11 is great, a large ghost will appear around boundaries in the width direction of the line. According to FIG. 11, as the machining path angle becomes smaller, the relative intensity becomes greater and therefore the ghost becomes larger. On the other hand, the ghost becomes smaller when the machining path angle is increased.

Figure 12:
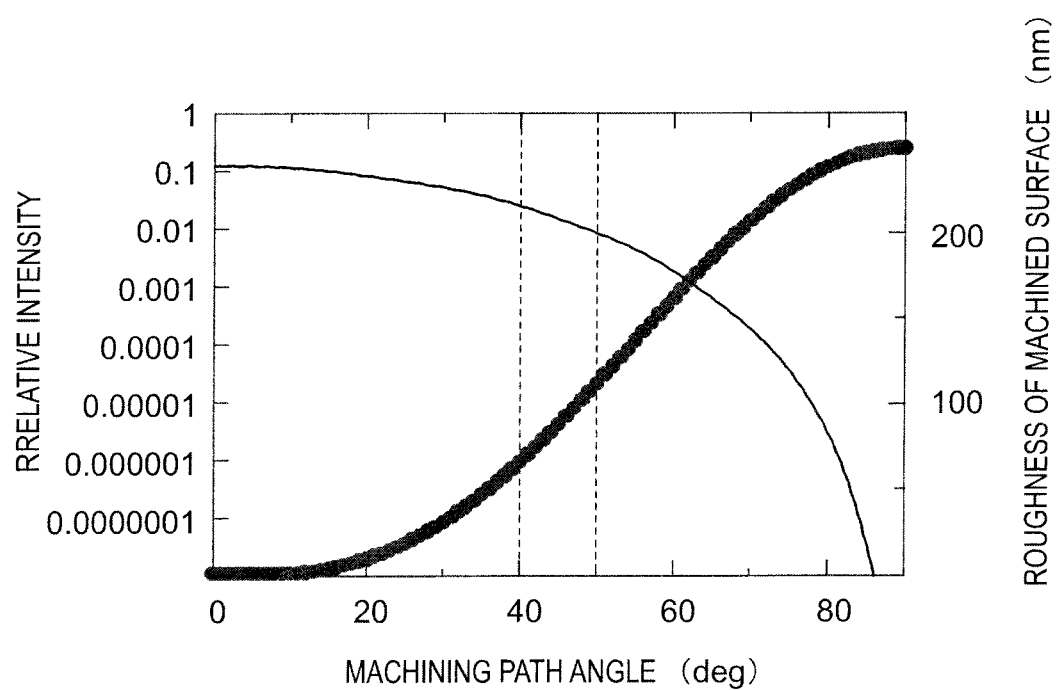
FIG. 12 shows a combination of the graph of FIG. 2 and the graph of FIG. 11.

FIG. 12 shows a combination of the graph of FIG. 2 and the graph of FIG. 11. The horizontal axis of FIG. 12 indicates angle which the direction of the machining path forms with X-axis (machining path angle). The vertical axis of FIG. 12 indicates roughness of the machined surface (on the scale on the right side) and relative intensity at second peaks after the peak at the center of the line in the width direction (on the scale on the left side). As shown in FIG. 12, the roughness of the machined surface increases as the machining path angle increases while the relative intensity decreases as the machining path angle increases. For example, in order to obtain roughness on the machined surface of 100 nanometers or less, machining path angle has to be set at 50 degrees or less. Further, for example, in order to obtain relative intensity of 0.02 or less, angle which the direction of the machining path forms with X-axis (machining path angle) has to be set at 40 degrees or more. Accordingly, when the machining path angle is set at a value between 40 and 50 degrees, a lens which is preferable from the standpoint of roughness of the machined surface as well as from the standpoint of relative intensity (intensity of ghost) can be obtained.

The machining path angle does not need to be constant all over the machined surface provided that it is between 40 and 50 degrees. The machining path angle may vary between 40 and 50 degrees depending on position on the machined surface. The machining path may be a curve on which the machining path angle is between 40 and 50 degrees. Further, the machining path angle does not need to be between 40 and 50 degrees all over the machined surface provided that it is between 40 and 50 degrees in an area which is 80% or more of the area of the machined surface, that is, the optical surface of the lens. The phrase "an area which is 80% or more" does mean to exclude specific areas in which the machining path is changed for other reasons.

In the above, the present invention is described using examples in which a grinding stone is used to machine a mold for glass. Besides the examples described above, the present invention can be applied similarly to cases in which a single crystal diamond tool or a polycrystalline diamond tool is used to machine a mold for glass. Further, the present invention can also be applied to cases in which a mold for plastic is machined.

What is claimed is:

1. A lens used for a line generating optical system which generates a line using light from a light source, wherein;
    X-axis is defined in longitudinal direction of the generated line, Y-axis is defined in width direction of the generated line and Z-axis is defined in direction of the optical axis and wherein;
    the light source and the lens are arranged along Z-axis such that lights emitted by the light source travel along Z-axis and pass through the lens to generate the line and wherein;
    the lens has an optical surface which does not collimate the light in X-axis direction and which collimates or collects the light in Y-axis direction alone, the optical surface being a free form surface, and wherein;
    the optical surface is formed using a mold which has been machined with a tool, inclination of direction of transferred tool mark with respect to X-axis being from 40 degrees to 50 degrees in an area of 80% or more of the optical surface when the lens is arranged in the line generating optical system.

2. A mold for the lens according to claim 1, comprising a surface of the mold corresponding to the optical surface of the lens.

3. A method for machining the mold according to claim 2, wherein the mold is machined such that the surfaced of the mold corresponding to the optical surface of the lens can be obtained.

* * * * *